US008819466B2

(12) United States Patent
Hartwich

(10) Patent No.: US 8,819,466 B2
(45) Date of Patent: Aug. 26, 2014

(54) METHOD AND DEVICE FOR WAKING USERS OF A BUS SYSTEM AND CORRESPONDING USERS

(75) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 13/391,250

(22) PCT Filed: Sep. 15, 2010

(86) PCT No.: PCT/EP2010/063538
§ 371 (c)(1),
(2), (4) Date: May 1, 2012

(87) PCT Pub. No.: WO2011/032979
PCT Pub. Date: Mar. 24, 2011

(65) Prior Publication Data
US 2012/0210154 A1    Aug. 16, 2012

(30) Foreign Application Priority Data
Sep. 16, 2009    (DE) .......................... 10 2009 041 435

(51) Int. Cl.
*G06F 1/32*    (2006.01)
(52) U.S. Cl.
USPC ............................. 713/323; 713/320; 713/324
(58) Field of Classification Search
CPC ................... G06F 1/3287; H04L 12/40039
USPC .......................................... 713/320, 323, 324
See application file for complete search history.

(56) References Cited

U.S. PATENT DOCUMENTS

| | | | |
|---|---|---|---|
| 6,115,831 A * | 9/2000 | Hanf et al. ...................... 714/43 |
| 6,593,845 B1 * | 7/2003 | Friedman et al. ........... 340/10.33 |
| 6,697,383 B1 * | 2/2004 | Li et al. ......................... 370/510 |
| 7,890,229 B2 * | 2/2011 | Huebl ............................. 701/36 |
| 8,392,731 B2 * | 3/2013 | Asano et al. .................. 713/310 |
| 2004/0145500 A1 * | 7/2004 | Huebl ............................ 340/994 |
| 2006/0075086 A1 * | 4/2006 | Muth ............................ 709/224 |
| 2008/0276107 A1 * | 11/2008 | Bogavac ....................... 713/323 |
| 2009/0213915 A1 * | 8/2009 | Wagner ......................... 375/220 |
| 2011/0107130 A1 * | 5/2011 | Huebl ........................... 713/323 |
| 2012/0221753 A1 * | 8/2012 | Hartwich ...................... 710/107 |

FOREIGN PATENT DOCUMENTS

DE      10358584      7/2004

OTHER PUBLICATIONS

International Search Report, PCT International Application No. PCT/EP2010/063538, dated Nov. 30, 2010.
Robert Bosch GmbH, "CAN Specification version 2.0,"Sep. 1991, <http://www.infineon.com cmc_upload/migrated_files/document_files/Application_Notes/can2spec.pdf>, pp. 9, 29.

* cited by examiner

*Primary Examiner* — Vincent Tran
(74) *Attorney, Agent, or Firm* — Kenyon & Kenyon LLP

(57) ABSTRACT

An apparatus for waking up users of a CAN bus system, wherein a sensing element, in particular a counter, is provided which senses at least one predefined signal property of the signals transmitted on the bus system and initiates the further wakeup operation when a predefined number is reached with reference to the signal property, the data stream of the CAN bus itself being used as a clock for detecting the signal property.

15 Claims, 4 Drawing Sheets

METHOD AND DEVICE FOR WAKING USERS OF A BUS SYSTEM AND CORRESPONDING USERS

FIELD OF THE INVENTION

The present invention relates to a method and an apparatus for waking up users of a bus system, and a corresponding user.

BACKGROUND INFORMATION

Control devices in motor vehicles are, to an increasing extent, continuously supplied with voltage (also called "terminal 30" capability) so that certain monitoring and control functions can be performed even with the ignition switched off. These can be instances of, for example, access and driving authorization, or diagnosis. To reduce power consumption, the control devices are put into a so-called "sleep" mode. This is done either by switching off the voltage regulator or by entering into a corresponding operating mode of the microcontroller.

The control device must be woken up when necessary. This occurs by way of a lead, provided for the purpose, either to a wakeup input of the microcontroller of the user or to a wakeup input of the voltage regulator. In present-day systems, which are usually networked, it can also occur by way of an activity on the bus lines.

A disadvantage of this is that either a separate wakeup lead must be routed to all required control devices; or in the case of waking via the bus, all the control devices (including those not required) are woken by a desired or undesired bus activity, either by communication on the bus or by interference on the bus.

Present-day CAN transceivers can be operated substantially in two modes: in the active mode for communication, and in the sleep mode for the power-saving idle state. The application program can set the desired operating mode; the transceiver also switches, in particular automatically, from the sleep mode into the active mode as soon as it detects a signal or a signal property, e.g., a dominant bit, on the CAN bus. While the transceiver is in sleep mode, the remainder of the CAN node can be switched off and is then switched back on when the CAN transceiver switches into the active mode.

German Patent Application No. DE 103 58 584 A1 describes a method by which a CAN transceiver is expanded to include a circuit that decodes 8-bit-long patterns from an 8-byte-long data field of a CAN message. As a result, the CAN transceiver can be operated in four modes. In addition to the modes previously described, there is also a further economy mode and an intermediate mode. The transceiver automatically switches from the sleep mode into the economy mode as soon as it detects a dominant bit on the CAN bus. In the economy mode, it senses a signal property and switches into the intermediate mode when it detects a number of signal properties, for example edges, within a predefined time span. It then switches from the intermediate mode into the active mode only as soon as it detects a specific pattern in the 8-byte-long data field of the re-transmitted CAN message, which it decodes for that purpose according to a specific method. This wakeup pattern can be configured separately for each CAN transceiver. The CAN identifier of this message is predefined for this method. If it does not detect the wakeup pattern in this message, it goes back into economy mode. The power consumption in the intermediate mode is only slightly higher than in the economy mode; the remainder of the CAN node can remain switched off. This makes possible CAN networks in which individual nodes remain in controlled fashion in the power-saving economy mode, while the other nodes communicate via the CAN bus. The individual nodes can be selectively woken up from the economy mode. This is also called "selective wakeup."

It is thus possible, via the bus used in motor vehicles (in particular a CAN bus), to selectively wake up only the control devices that are needed in order to perform the necessary functions.

SUMMARY

An object of the present invention is to provide a method and an apparatus that expand the selective wakeup method so that different identifiers for the wakeup message can also be programmed.

In accordance with the present invention, a method and an apparatus for waking up users of a bus system are provided, a counter being provided which counts at least one predefined signal property of the signals transferred on the bus system, and initiates the further wakeup operation upon reaching a predefined number.

Advantageously, an edge or an edge transition of the signal is provided as a predefined signal property.

A signal level or a specific combination of several signal levels can likewise usefully be provided as a predefined signal property.

It is particularly advantageous if upon the first occurrence of the signal property, a time duration is determined; and there results from the time duration thereby determined, after the first occurrence, from the signal properties referred to the time duration, a binary information that enables a selective wakeup of users of the bus system.

The user to be woken up can be read out from the information obtained; this can be accomplished by analysis of the bulletin or message that has led to authorization of the sleep mode, or also of a re-transmitted further wakeup bulletin or message.

Advantageously, the control devices connected to the bus can thus entirely switch off their microcontrollers, or put them into a sleep mode having clocks likewise switched off, such that only the transceiver connected to the bus, in particular a CAN transceiver of very low power consumption, needs to be supplied with standby power. Thanks to the use of the time duration that is determined upon the first occurrence of one of the signal properties, decoding can occur irrespective of the bus system transfer rate that is used, and errors in the block structure with respect to the communication blocks in the bus system can additionally be detected by way of the evaluation.

The configuration capabilities for the wakeup method via the CAN transceiver having a selective wakeup function are expanded, according to the present invention, to include a setting as to how many edges are to be counted in the arbitration field and the control field of the wakeup message. Each message for which this count yields the preset value is regarded provisionally as a wakeup message (first stage of the method), pending successful decoding of the wakeup pattern encoded according to a specific method in the data field (second stage of the method).

An advantage of this method is that in the configuration of the CAN network, the identifier for the wakeup message can be freely selected, for example in terms of its priority by comparison with the other messages. Both an 11-bit identifier and a 29-bit identifier can be selected. Various CAN nodes in the network can also use different wakeup identifiers, thereby increasing the number of nodes that can be individually woken up.

A further advantage of the method is that the clock of the transceiver can be switched off before the wakeup operation begins, since the bus signal that is present is itself employed as a clock for the first stage of the wakeup method.

BRIEF DESCRIPTION OF THE DRAWINGS

The present invention is explained in further detail with reference to the Figures.

DETAILED DESCRIPTION OF EXAMPLE EMBODIMENTS

Figure 1:
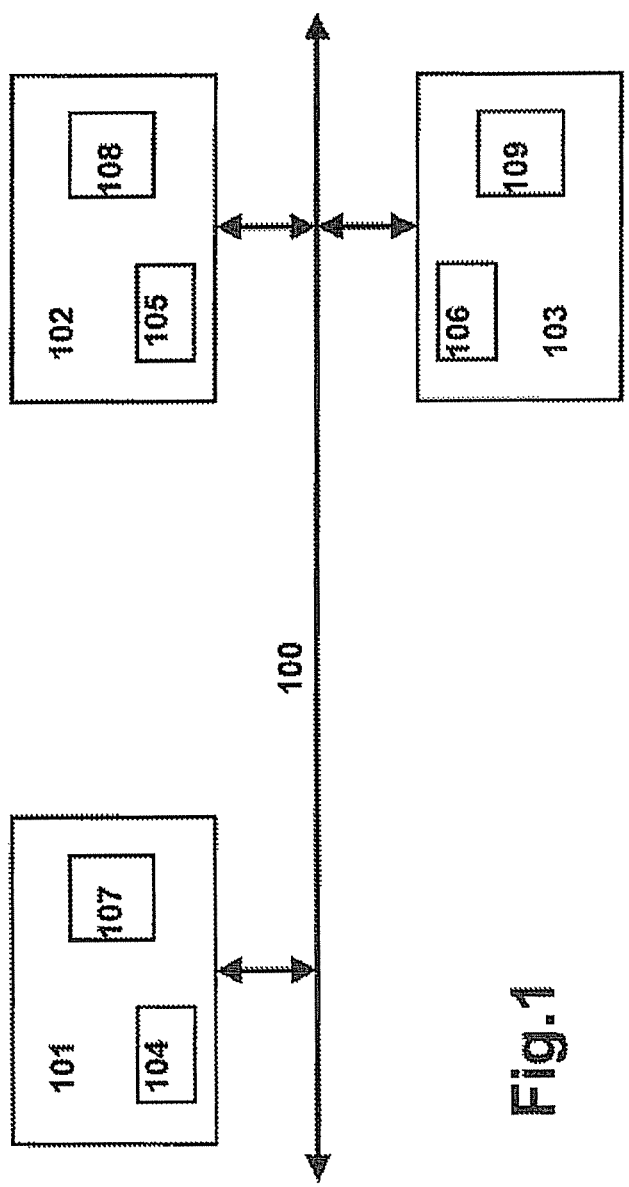
FIG. 1 shows a bus system having several, at least two, users.

FIG. 1 shows a bus system 100 having bus users 101, 102, and 103. The latter each contain a transceiver or a media connector unit 107, 108, 109 respectively, as well as a time-sensing or counting module having an integrated clock 104, 105, or 106. The latter can in each case be located outside the corresponding transceiver or media connector unit, but can also be expressed as a constituent thereof. As already mentioned, in this exemplifying embodiment only those control devices that are needed to perform the required functions are to be selectively woken via the CAN bus that is often used in motor vehicles. Devices can also be combined into groups that react to the same wakeup information.

One possibility would be to use specific parts of a message or of a CAN frame (e.g., identifier) for selection. A prerequisite for this, however, is that the wakeup device be continuously connected to a clock that is in operation; this, however, makes a substantial contribution to power consumption. This kind of wakeup requires that the transfer rate of the bus be known, and that the clock must exhibit only very small fluctuations as a result of external influences such as, for example, supply voltage or temperature, etc. A selection method operates in multiple stages, and that in the first stage makes do without clocks that are in operation.

In the idle state, the control devices or users that are connected to the bus, for example 102 and 103, can switch off their microcontrollers completely or put them into a state with a switched-off clock. The time-sensing or counting module having clock 105 or 106, respectively, is also put into a sleep mode in which the integrated clock is switched off. In the users in the idle state, for example 102 and 103, only the CAN transceiver connected to the bus, or the media connector unit, having a very low power consumption, is supplied with standby power.

The selection mechanism becomes activated when a user, for example 101, transmits on the bus a characteristic signal for waking up users 102 and/or 103. In a first step, users 102 and 103 switch into the economy mode and count edges of the transmitted bus signal. The time-sensing or counting module having clock 105 or 106 becomes activated. The switchover into the intermediate state occurs as a function of the result of the edge count. In the intermediate state, the content of the data field is decoded with the aid of clock 105 or 106, and is compared with a stored wakeup address. In the event of a positive result, the user switches into the active mode and, for example, the microcontrollers and/or further voltage regulators of users 102 and 103, respectively, become activated.

The present invention can similarly be implemented as a single-stage wakeup in which both steps of the method are cycled through based on the evaluation of a single received message. It is also possible, however, in order to further enhance wakeup reliability, to execute a two-stage wakeup in which the two steps of the method are cycled through based on the evaluation of two successively received messages.

If multiple devices react to the same wakeup mechanisms (to the same characteristic signals), then entire groups of devices can also be woken; or the devices can be combined into groups, or specific devices can be woken for specific applications.

By way of the logical structure, it is possible to derive the information from the message irrespective of the transfer rate used, as will be explained in further detail later on. In this context, the number of changes between High and Low, or 0 and 1, i.e., the binary information, is largely constant.

It is particularly preferred that the wakeup message be a bulletin that is constructed according to the CAN bus ISO standard, that does not violate said standard and thus causes no problems in existing systems. A CAN controller, as used in other approaches, is thus not necessary here.

The configuration capabilities for the wakeup method via the CAN transceiver having a selective wakeup function are expanded, according to the present invention, to include a setting as to how many edges are to be counted in the arbitration field and control field of the wakeup message. Every message for which this count yields the preset value is regarded provisionally as a wakeup message (first stage of the method), pending successful decoding of the wakeup pattern encoded, according the method described below, in the data field (second stage of the method).

In the configuration of the CAN network, the identifier for the wakeup message can be freely selected, for example with regard to its priority as compared with the other messages. Both an 11-bit identifier and a 29-bit identifier can be selected. Various CAN nodes in the network can also use different wakeup identifiers, thereby increasing the number of nodes that can be individually woken up. If only the arbitration field and control field are evaluated (as in this example), the result of the first stage of the wakeup method is available in time for the second stage, i.e. decoding of the wakeup pattern in the data field, still to be carried out on the basis of the same message.

Figure 2:
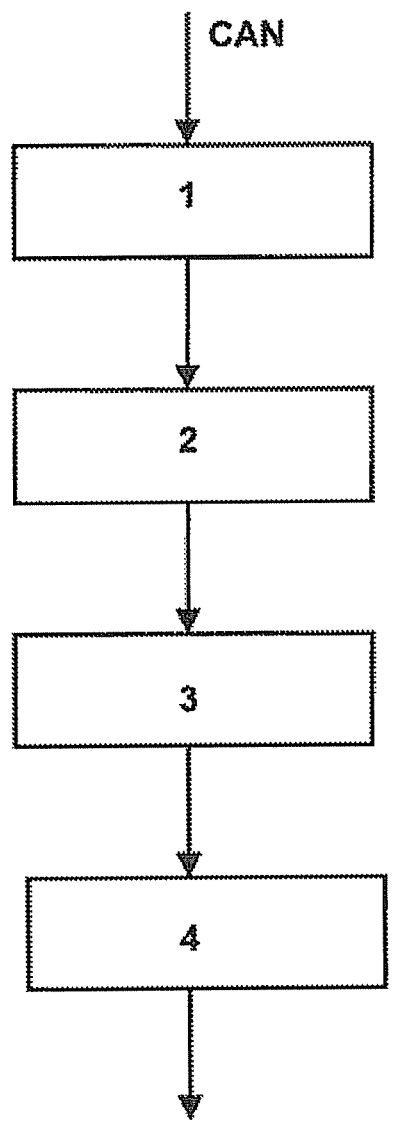
FIG. 2 shows an example method sequence according to the present invention in the form of a flow chart.
Figure 3:
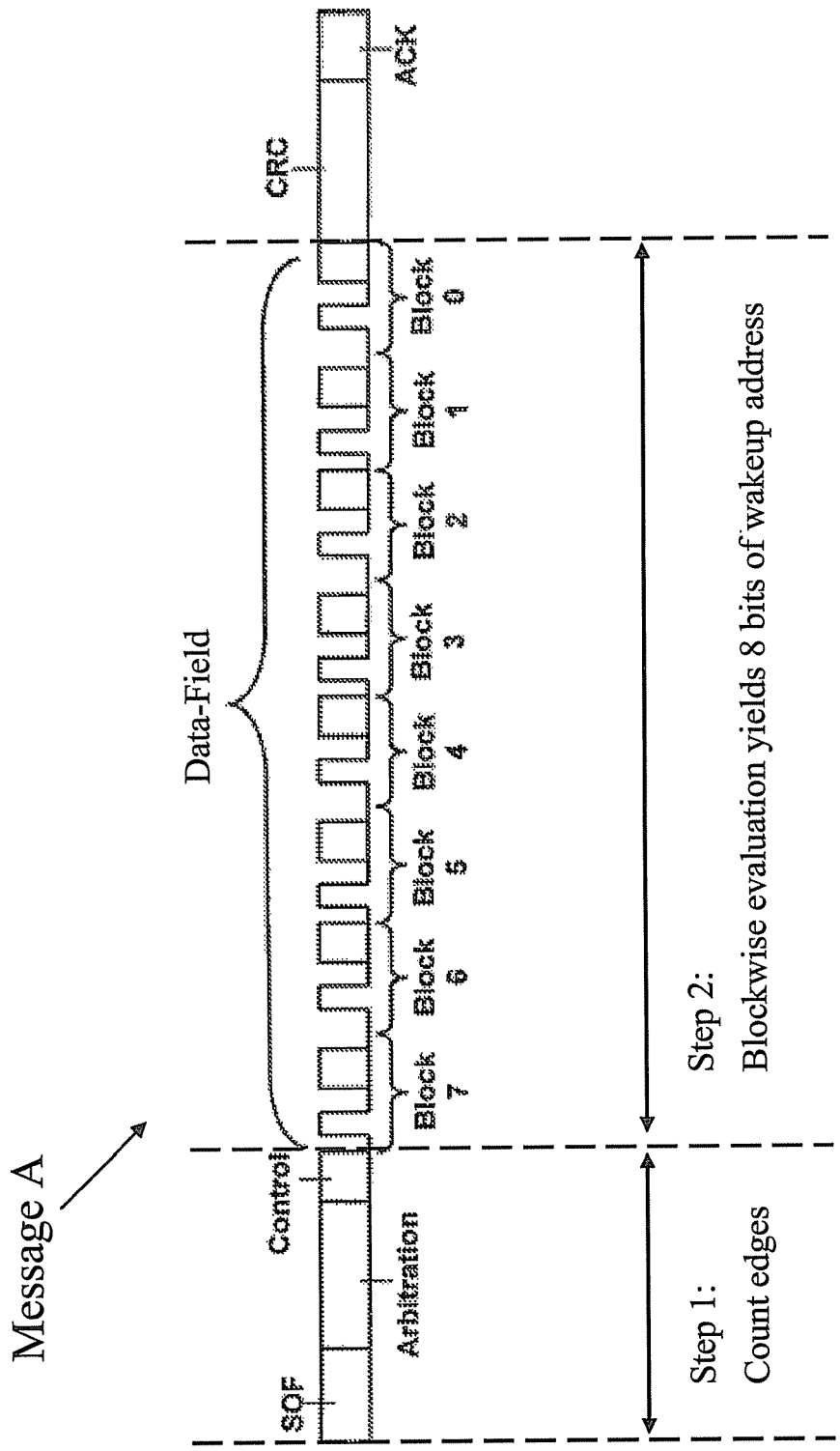
FIG. 3 depicts, by way of example, a bulletin having the wakeup information encoded in the data field.

FIG. 2 depicts a schematic flow chart as an example. FIG. 3 depicts, by way of example, the format of the wakeup message and the two steps of the wakeup procedure. The sender of the wakeup request sends on the bus, such as a CAN bus in the example here, a message A in accordance with FIG. 3, in which message the receiver or receiver group to be woken up is encoded with a number. In the idle state, the bus is recessive. When the first bulletin comes (which can be detected by the switchover to dominant and occurs in block 1 of FIG. 2), a counter is activated. The number of edges of the bulletin is then counted over a specific time, for example during the arbitration field and the control field, in block 2 of FIG. 2. For synchronization to the bus clock cycle, the bit stream of the bus is evaluated in accordance with the method discussed below.

If the number of edges ascertained is within the permissible limits, the second part of the circuit is activated. A first separation is thereby achieved between communication or interference on the bus, and a wakeup request. If this comparison turns out positive, i.e., if a wakeup request exists, the second stage of the logic system is supplied with power. The wakeup logic system, i.e., in particular the processing unit, reads out from the data field using time-sensing or counting module 105, 106, in accordance with the example method discussed below, the number of the device or device group that is to be woken up. This occurs in block 3 of FIG. 2. If the number read out matches a stored one, the device is activated in block 4 of FIG. 2 by activating the voltage regulators or waking up the microcontroller, and the corresponding user participates in bus traffic. In this flow chart, the two-stage wakeup method is depicted with the combination of blocks 2 and 3, as described above. It is likewise possible to use only one of the two stages as a wakeup criterion.

With five configuration bits, for example, the maximum possible number of edges in the combined arbitration and control field of a CAN data frame can be described with 29-bit identifiers and DLC-8. Optionally, all the edges can be counted, or only those from dominant to recessive, or those from recessive to dominant. The target value, or a permissible range, for the edges expected in a wakeup message can be stored in a suitable memory region, and used for the first step of the wakeup operation.

Digital circuits that are intended to decode the patterns from serial data sequences use a clock cycle for that purpose. An objective of the example method described here is to minimize the power consumption of the transceiver for the time before it has detected the wakeup pattern. The clock cycle is therefore halted when it is not required for decoding, and restarted as soon as the beginning of a message (dominant SOF bit) is detected.

The particular decoding method for the wakeup pattern in the data field of a CAN message allows a considerably higher clock cycle tolerance than the CAN protocol itself. An oscillator nevertheless needs time to stabilize adequately after it starts.

The clock cycle of the oscillator is therefore not used for counting the edges in the arbitration field and control field, but instead the data stream of the CAN bus itself is used as a clock cycle. This data stream can be used serially. This is the first stage of the wakeup method. As a result, the oscillator has at least 18 CAN bit times (36 is at 500 kbit/s) to stabilize itself before an attempt is then made, in the second stage of the wakeup method, to decode the wakeup pattern using that clock cycle. For this, the CAN transceiver is switched into the intermediate mode.

This two-stage decoder method can, with a single CAN message, bring a CAN transceiver out of the economy mode into the active mode, and wake up the remainder of the CAN node.

A variety of conditions can be defined as to when the oscillator of the transceiver is stopped again:
1. The transceiver switches into the active mode.
2. The edge counter reaches a specific value. This value is determined from the configured value of the edges in the arbitration and control field plus a constant, since the particular form of the wakeup pattern coding stipulates a constant number of edges in a valid wakeup pattern.
3. A time circuit (e.g. RC element) starting at an SOF bit.
4. The CAN bus remains at the recessive level for more than approximately six CAN bit times (measured with e.g. an RC element).

FIG. 3 shows the procedure in the second stage of the wakeup method. According to FIG. 3, message A is used in a preferred form as a message constructed according to the CAN bus ISO standard. A "start of frame" (SOF), an arbitration field that as a rule contains the identifier, and a control field are provided before the data field. Contained after the data field is a check number as a cyclic redundancy check (CRC), and a confirmation field with regard to the bulletin transfer (an acknowledgment ACK). Message A contains the number of the device or device group in the data field. Any valid CAN address can be used as a CAN identifier. The frame thus conforms to the CAN bus specification, and communication by other devices via the CAN bus is not disrupted.

As depicted in FIG. 3, the entire data field in the frame, in particular in the CAN frame, is made up here of 64 bits subdivided into eight blocks, i.e., block 0 to block 7. At least one bit of the device number is encoded in each block. If exactly one bit of the device number is encoded in each block, the circuit can obtain, from a CAN frame as depicted, eight bits for further processing. Transfer errors can be detected by way of the interleaving of these eight bits.

Figure 4:
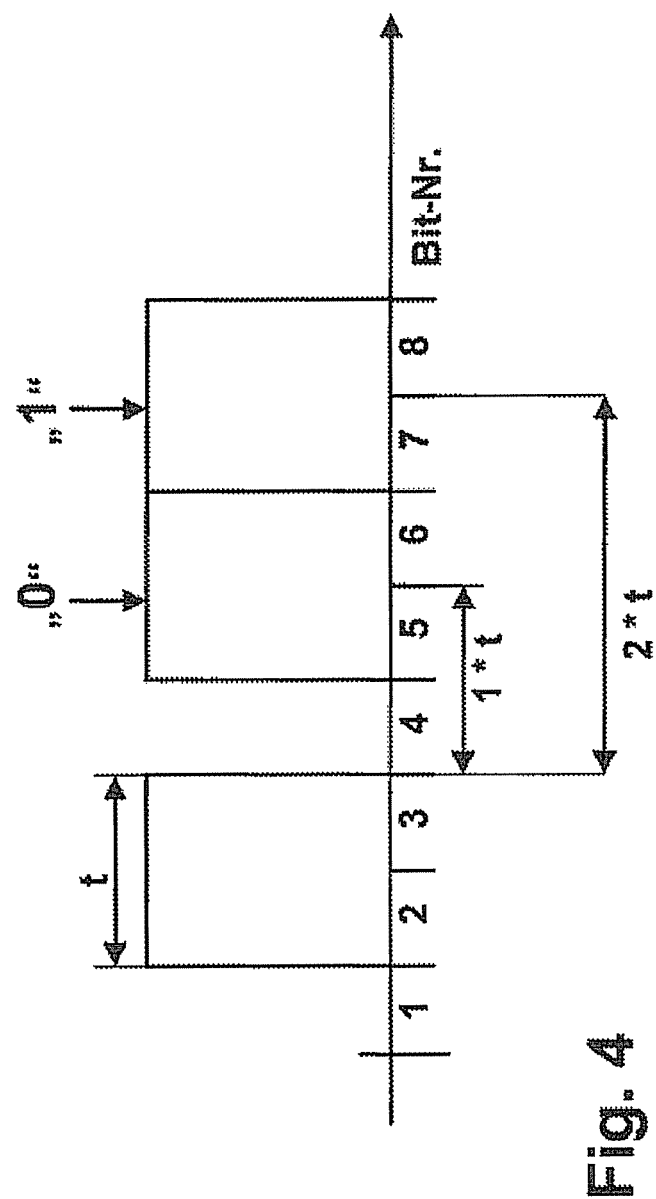
FIG. 4 shows the example structure according to the present invention of a block in the data field for identifying the signal property having encoded information.

The particular structure of the individual blocks 0 to 7 of FIG. 3 is depicted in FIG. 4. As a result of this particular structure of the eight blocks, coding can occur irrespective of the bus transfer rate that is used. In addition, errors in the block structure can still be detected. In this context, one block corresponds to eight bits from the CAN data field.

The structure of a block is depicted by way of example in FIG. 4. Here bits 2 and 3 are High in order to measure or determine a time t. After the end of bit 3, the wakeup logic or processing unit waits once for the previously determined time t and stores the state that then occurs, then waits for time t once again and stores the new state that then occurs. The times t and 2t as depicted in FIG. 4 can be selected so that High or Low signals can be entirely detected in the context of the signal levels. Also possible is a detection of the signal edges, for example from bit 4 to bit 5 and bit 6 to bit 7, by corresponding selection of the respective time segments. What results is a coding capability, irrespective of the transfer rate used, for a 0 information (here in bits 5 and 6) and a 1 information (here via bits 7 and 8).

In other words, in the coding example in FIG. 4, bit 1 is always 0 and bit 2 and bit 3 are always 1, in order to calibrate time t; and bit 4 is in turn always 0 for separation between the calibration time and the actual binary information. Bits 5 and 6 are selected here so that they are at High, which then means a logical 0 for the block. Bits 7 and 8 are then selected in such a way, which would signify a logical 1 for the block. In other words, if bits 5 and 6 are at 1, the block contains a logical 0; and if bits 7 and 8 are at 1, the block then contains a logical 1. In other words, the bits are set here so that either bits 5 and 6 are at 1, or bits 7 and 8. In other words, the example method described here exhibits a baud-rate-independent transfer, in particular by counting edges or edge transitions, or the corresponding signal level, in accordance with the respectively predefined signal property: on the one hand as a first wakeup stage and, in the context of evaluation of the encoded binary information in the same message, as a second, selective wakeup stage, in a multi-stage concept. The predefined signal property can be, as already mentioned, on the one hand the signal level (i.e. 0 or 1 as in the example of FIG. 4) but also, as already stated, evaluation of the signal edges or of the signal edge transition. What results is a simple capability for selectively waking up control devices without entailing additional circuit complexity and without always producing power consumption by all the users of the bus system, including those that are not needed.

The CAN transceivers described here can be used for CAN and/or for TTCAN networks.

What is claimed is:
1. An apparatus for waking up users of a CAN bus system, comprising:
a sensing element configured to sense at least one predefined signal property of a signal transmitted on the bus system and to initiate a further wakeup operation when a predefined number is reached with reference to the signal property;

wherein a data stream of the CAN bus itself is used as a clock cycle for detecting the at least one predefined signal property, and wherein the at least one predefined signal property is a specified number of edges in at least one of an arbitration field and a control field of a CAN message.

2. The apparatus as recited in claim 1, further comprising: a counter to count occurrences of one of the at least one signal property.

3. The apparatus as recited in claim 1, wherein the predefined number at the reaching of which the further wakeup operation is initiated is stored in a memory region.

4. The apparatus as recited in claim 1, further comprising: one of a counter or a timer to sense a time duration between two sensing times of signal properties.

5. The apparatus as recited in claim 4, wherein the one of the counter or timer is switched off before the beginning of the wakeup operation.

6. The apparatus as recited in claim 1, wherein for the further wakeup operation, at least one of: i) at least one profile, ii) at least one pattern, or iii) at least one sequence of at least one signal property is sensed, and is compared with at least one of: i) at least one profile, ii) at least one pattern, or iii) at least one sequence stored in a memory provided therefor.

7. The method as recited in claim 6, wherein a time duration is determined upon occurrence of one of the at least one signal property.

8. The method as recited in claim 7, further comprising:
ascertaining binary information from a value of one of the at least one signal property after a previously ascertained time duration has elapsed again at least once;
creating one of a profile, a sequence, or a pattern of signal property from several items of binary information ascertained; and
comparing the one of the profile, the sequence, or the pattern of the signal property with one of: i) at least one stored profile, ii) at least one stored sequence, or iii) at least one stored pattern, wherein the wakeup operation is or is not initiated as a function of a result of the first comparison.

9. The method as recited in claim 6, wherein in a first step, one of the at least one signal property is counted by a counter and is compared in a first comparison with at least one threshold value or limit value, and the wakeup operation is initiated as a function of the result of the first comparison; and in a second step, a time duration is ascertained from a value of one of the at least one signal property, and binary information is ascertained after the ascertained time duration has elapsed again at least once, wherein from several items of binary information ascertained, one of a profile, a sequence, or a pattern of a signal property is created and is compared with at least one of: i) at least one stored profile, ii) at least one stored sequence, or iii) at least one stored pattern, and the wakeup operation is or is not carried out as a function of a result of the second comparison.

10. The method as recited in claim 9, wherein a message received in an idle state is evaluated as a wakeup message, the first step of the wakeup method and the second step, selective for one of individual users or groups of users, of the wakeup method being carried out by evaluating a same message that is received once.

11. The method as recited in claim 9, wherein wakeup messages are sent several times, and a message received in an idle state is evaluated as a wakeup message, and after initiation of the further wakeup operation, another reception of the wakeup message is awaited, and after another reception, the second step, selective for individual users or groups of users, of the wakeup method is carried out.

12. A method for waking up users of a CAN bus system, comprising:
sensing at least one predefined signal property of a signal transmitted on the bus system; and
initializing a further wakeup operation when a predefined number is reached with reference to the signal property;
wherein a data stream of the CAN bus itself is used as a clock cycle for detecting the at least one predefined signal property, and wherein the at least one predefined signal property is a specified number of edges in at least one of an arbitration field and a control field of a CAN message.

13. The method as recited in claim 12, further comprising:
sending a message over the bus system;
evaluating the message as a wakeup message by sensing; and
evaluating at least one of the at least one signal property from the message.

14. The method as recited in claim 13, wherein one of the at least one signal property is counted by a counter and is compared with at least one threshold value or limit value, and as a function of the result of the comparison, the wakeup operation is or is not initiated.

15. A user of a CAN bus system, comprising:
an apparatus for waking up users of the CAN bus system, the apparatus including a sensing element configured to sense at least one predefined signal property of a signal transmitted on the bus system and to initiate a further wakeup operation when a predefined number is reached with reference to the signal property, wherein a data stream of the CAN bus itself is used as a clock cycle for detecting the at least one predefined signal property, and wherein the at least one predefined signal property is a specified number of edges in at least one of an arbitration field and a control field of a CAN message.

* * * * *